US011148728B2

(12) United States Patent
Saeki

(10) Patent No.: US 11,148,728 B2
(45) Date of Patent: Oct. 19, 2021

(54) VEHICULAR LOWER STRUCTURE

(71) Applicant: Toyota Jidosha Kabushiki Kaisha, Toyota (JP)

(72) Inventor: Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 16/718,917

(22) Filed: Dec. 18, 2019

(65) Prior Publication Data

US 2020/0207423 A1 Jul. 2, 2020

(30) Foreign Application Priority Data

Dec. 28, 2018 (JP) .............................. JP2018-246425

(51) Int. Cl.
*B60J 7/00* (2006.01)
*B62D 25/20* (2006.01)
*B60K 1/04* (2019.01)

(52) U.S. Cl.
CPC ............... *B62D 25/20* (2013.01); *B60K 1/04* (2013.01); *B60K 2001/0433* (2013.01)

(58) Field of Classification Search
CPC .... B62D 21/152; B62D 25/04; B62D 25/025; B29C 70/504; B60R 19/18; B60K 23/0808; B60K 17/35; B60T 8/1755; B60T 8/266; A43B 5/048
See application file for complete search history.

(56) References Cited

U.S. PATENT DOCUMENTS

| | | | | |
|---|---|---|---|---|
| 5,555,950 A * | 9/1996 | Harada | ................. | H01M 50/20 |
| | | | | 180/65.1 |
| 7,204,547 B2 * | 4/2007 | Okana | ............... | B62D 25/2018 |
| | | | | 296/203.01 |
| 8,689,919 B2 * | 4/2014 | Maeda | ................ | B62D 25/025 |
| | | | | 180/68.5 |
| 8,910,737 B2 * | 12/2014 | Saeki | ...................... | B60K 1/04 |
| | | | | 180/68.5 |
| 9,205,872 B2 * | 12/2015 | Okada | .................... | B62D 25/02 |
| 9,821,645 B2 * | 11/2017 | Hayashi | ................ | B62D 25/20 |
| 9,987,913 B2 * | 6/2018 | Hara | ..................... | H01M 50/20 |
| 10,118,475 B2 * | 11/2018 | Sugizaki | .............. | H01M 50/20 |
| 10,166,852 B2 * | 1/2019 | Ishihara | ............. | B60R 16/0207 |
| 10,207,740 B2 * | 2/2019 | Yamada | .................. | B60R 19/18 |
| 10,464,406 B2 * | 11/2019 | Kawabe | ................... | B60K 1/04 |
| 10,486,515 B2 * | 11/2019 | Saeki | ...................... | B62D 25/20 |
| 10,632,827 B2 * | 4/2020 | Ajisaka | ............... | B62D 21/152 |
| 10,756,401 B2 * | 8/2020 | Inoue | ................... | H01M 10/613 |
| 10,793,195 B2 * | 10/2020 | Kato | .................... | B62D 25/025 |
| 10,800,459 B2 * | 10/2020 | Ayukawa | ................ | B60J 5/0427 |
| 10,875,582 B2 * | 12/2020 | Tsuyuzaki | ........... | B60R 13/0861 |
| 10,899,389 B2 * | 1/2021 | Kasai | ................... | B62D 21/157 |
| 10,913,340 B2 * | 2/2021 | Tsuyuzaki | ............ | B62D 25/025 |

(Continued)

FOREIGN PATENT DOCUMENTS

JP 2016-199105 A 12/2016

*Primary Examiner* — Kiran B Patel
(74) *Attorney, Agent, or Firm* — Dinsmore & Shohl LLP

(57) ABSTRACT

A floor cross member includes an extension portion at a front flange. The extension portion is bent at the front end of the front flange, and extends downward to the front side so that the front end of the extension portion is connected to the front floor panel. The reinforcement member is provided for the extension portion.

2 Claims, 8 Drawing Sheets

(56) References Cited

U.S. PATENT DOCUMENTS

| | | | |
|---|---|---|---|
| 10,967,912 B2 * | 4/2021 | Toyota | B60J 5/06 |
| 11,014,613 B2 * | 5/2021 | Muraoka | B60J 5/0479 |
| 2016/0301120 A1 | 10/2016 | Katsuno et al. | |
| 2020/0223303 A1 * | 7/2020 | Saeki | B60K 1/04 |

* cited by examiner

VEHICULAR LOWER STRUCTURE

CROSS REFERENCE TO RELATED APPLICATION

This application claims priority to Japanese Patent Application No. 2018-246425 filed on Dec. 28, 2018, which is incorporated herein by reference in its entirety including the specification, claims, drawings, and abstract.

TECHNICAL FIELD

The disclosure particularly relates to a vehicular lower structure having a battery pack mounted on a floor.

BACKGROUND

A hybrid vehicle or an electric vehicle that is driven by a rotary electric machine includes a battery pack as a power source mounted therein. JP 2016-199105 A discloses the battery pack mounted on a floor panel under a rear seat.

The battery pack as the heavy load is fixed to a frame member of the vehicle. Referring to FIG. 7, for example, a battery pack 500 has its front end fixed to a floor cross member 510. The floor cross member 510 as a frame member extending in a vehicle width direction includes a cross member upper 512 as an upper member and a cross member lower 514 as a lower member.

The cross member upper 512 is formed into an upward convex hat-like shape when seen from a vehicle width direction, and the cross member lower 514 is formed into a downward convex hat-like shape when seen from the vehicle width direction. Front flanges 516, 517 and rear flanges 518, 519 of the cross member upper and the cross member lower are fixed, respectively through spot welding or the like so that a closed section structure is formed.

Either the cross member upper 512 or the cross member lower 514 has an extension portion 520 extending forward from the front end of either the cross member upper or the cross member lower. Referring to an example of FIG. 7, the extension portion 520 extends from the front flange 516 of the cross member upper 512. The extension portion 520 is then connected to a front floor panel 530.

The cross member lower 514 has its bottom surface substantially leveled with the front floor panel 530. Accordingly, the front floor panel 530 is positioned lower than the front flange 516 of the cross member lower 514. The extension portion 520 is bent at the front end of the front flange 516, and extends downward to the front to reach the front floor panel 530 for connection between the front flange and the front floor panel.

The closed section structure formed by joining the cross member upper 512 and the cross member lower 514 exhibits relatively high rigidity. Meanwhile, the extension portion 520 in an unjoined state exhibits low rigidity. Accordingly, the extension portion 520 may be deformed as the floor cross member 510 supports the battery pack 500.

Assuming that the vehicle is traveling on a rough road, the floor cross member 510 and the battery pack 500 may be vertically vibrated owing to deformation of the extension portion 520 that occurs at bent points 522, 524 as indicated by broken lines of FIG. 7 and FIG. 8.

It is an advantage of the disclosure to provide a vehicular lower structure capable of restraining the vertical vibration of the battery pack more effectively than in the related art.

SUMMARY

The disclosure relates to a vehicular lower structure that includes a battery pack mounted on a floor. A front end of the battery pack is fixed to a floor cross member as a frame member extending in a vehicle width direction. The floor cross member includes a cross member upper as an upper member and a cross member lower as a lower member. The cross member upper includes an upward convex hat portion having a hat shape with an open lower section when seen from the vehicle width direction. The cross member lower includes a downward convex hat portion having a hat shape with an open upper section when seen from the vehicle width direction. A closed section structure is formed by fixing front flanges and rear flanges of the downward convex hat portion and the upward convex hat portion, respectively. One of the cross member lower and the cross member upper includes, on the front flange, an extension portion that is bent at a front end of the front flange, and extends downward to a front side to connect a front end of the extension portion to a floor panel. A reinforcement member is provided for the extension portion. The reinforcement member includes a reinforcement flange and a rib plate. The reinforcement flange is bent adapted to a region from the front flanges of the cross member lower and the cross member upper to the extension portion so as to be joined and fixed to the front flanges and the extension portion. The rib plate is inserted into an opening between the extension portion and the cross member lower while extending in a vehicle front-rear direction.

In the above-described structure, the reinforcement flange is joined (lined) with the extension portion along the bent shape so as to reinforce the bent point at which deformation is likely to occur. As the rib plate is inserted into the opening between the extension portion and the cross member lower, the deformation of the shape of the opening may be restrained.

In the disclosure, the plurality of reinforcement members may be disposed for the floor cross member at equal intervals along the vehicle width direction.

In the above-described structure, the reinforcement members disposed at equal intervals serve to equally restrain deformation of the extension portion.

The disclosure allows restraining of the vertical vibration of the battery pack more effectively than in the related art.

BRIEF DESCRIPTION OF DRAWINGS

An embodiment of the present disclosure will be described based on the following figures, wherein.

DESCRIPTION OF EMBODIMENT

Figure 1:
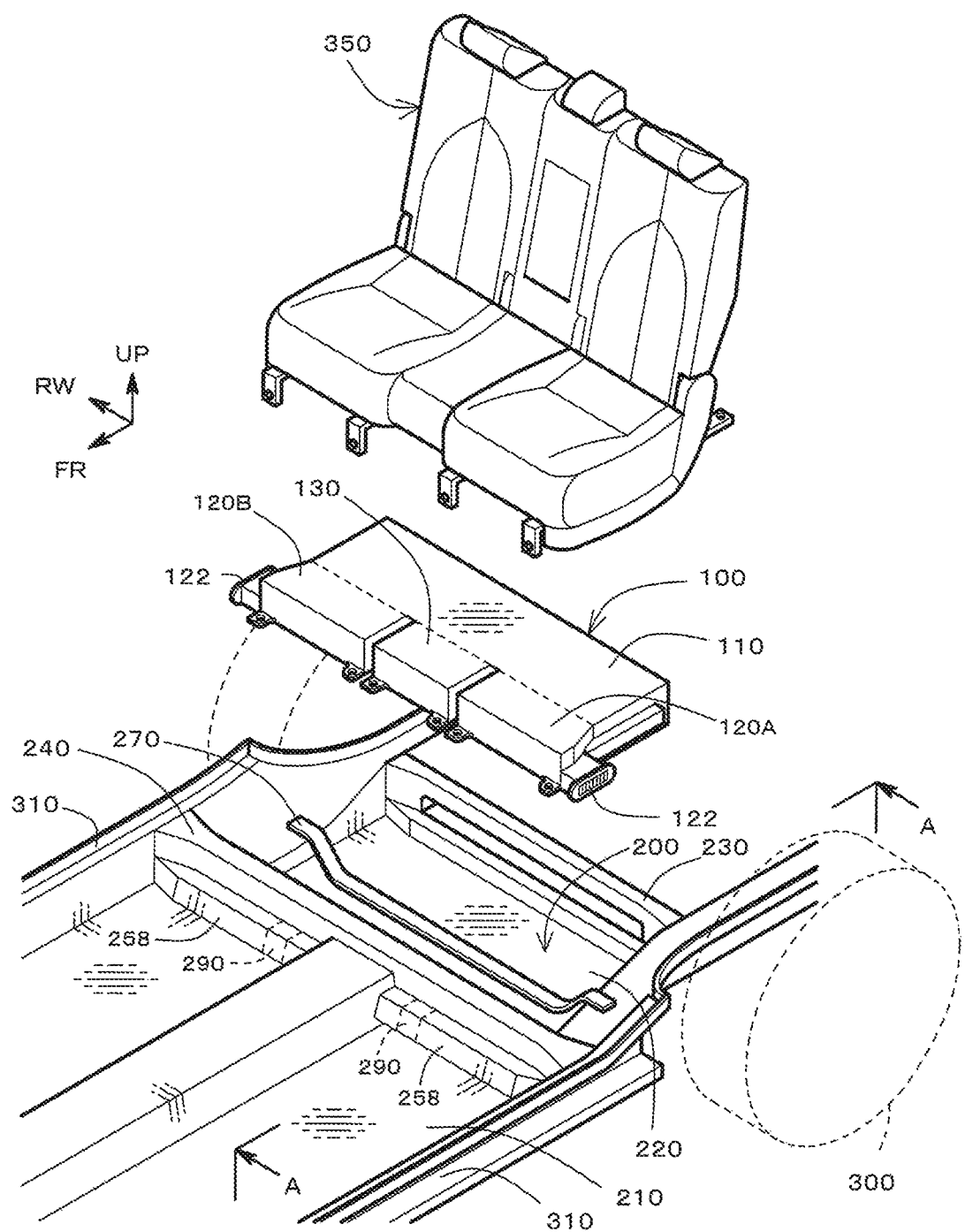
FIG. 1 is a perspective view of an exemplary vehicular lower structure according to an embodiment in an exploded state.
Figure 2:
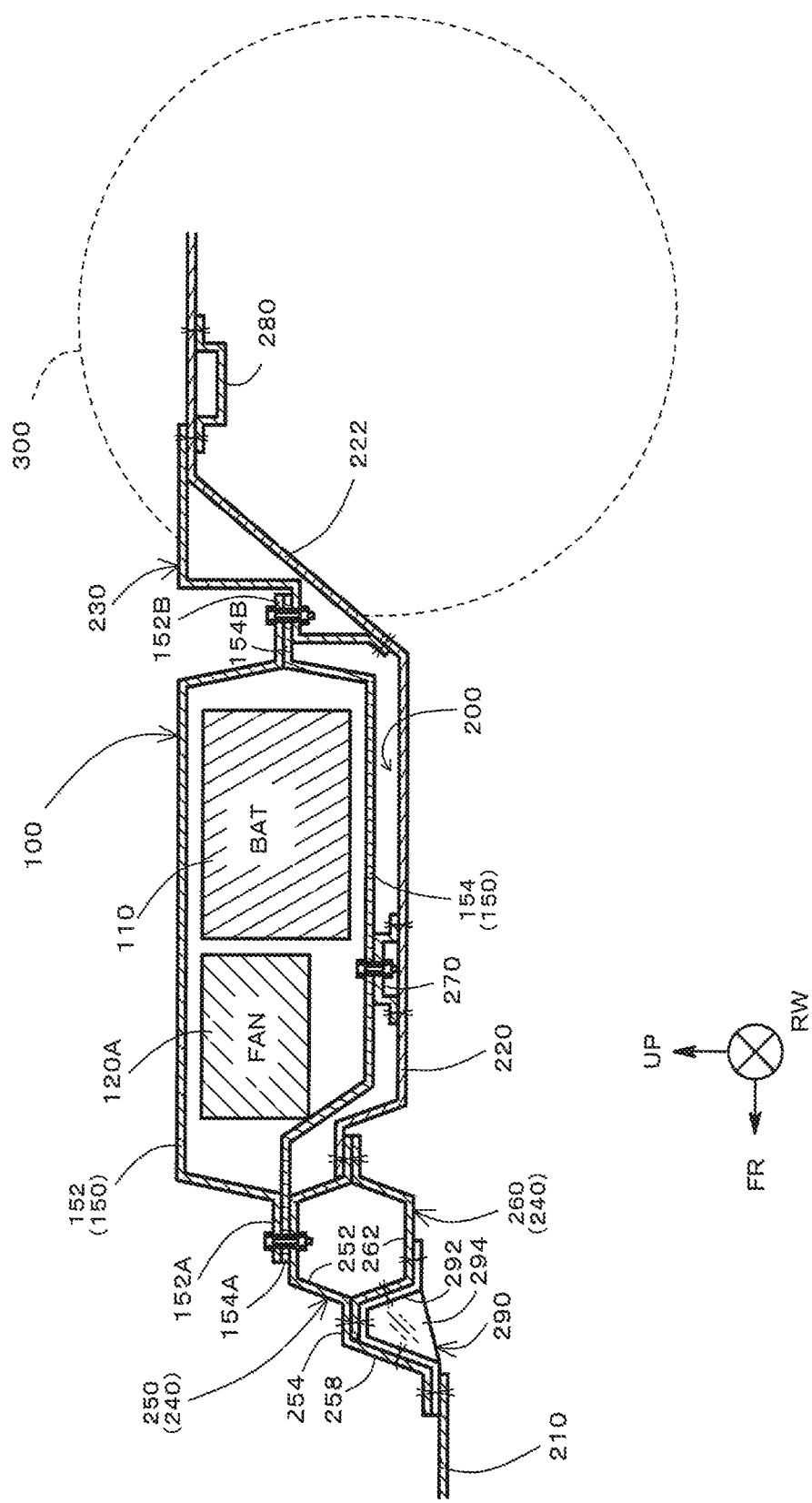
FIG. 2 is a sectional view taken along line A-A of FIG. 1.

FIG. 1 shows an example of a vehicular lower structure according to an embodiment. FIG. 2 is a sectional view taken along line A-A of FIG. 1. In FIG. 1 to FIG. 6, an axial direction marked with FR denotes the vehicle front-rear direction, an axial direction marked with RW denotes the vehicle width direction, and an axial direction marked with UP denotes the vehicle height direction. The forward direction of the vehicle along the axis of the vehicle front-rear direction FR is defined as the positive direction, the right direction along the axis of the vehicle width direction RW is defined as the positive direction, and the upward direction along the axis of the vehicle height direction UP is defined as the positive direction. Those three axes are mutually orthogonal to one another.

The vehicular lower structure according to the embodiment is applied to a hybrid vehicle or a electric vehicle that is driven by a rotary electric machine.

The vehicular lower structure according to the embodiment includes a battery pack 100 that is disposed in a battery storage space 200 formed on a rear floor panel 220 under a rear seat 350.

Referring to FIG. 1 and FIG. 2, the battery storage space 200 partially constitutes the rear floor panel 220 while being interposed between a floor cross member 240 and a fastening panel 230 in the vehicle front-rear direction.

Referring to FIG. 2, a front end of the rear floor panel 220 is bonded to a rear end of the floor cross member 240. Each welding point shown in FIG. 2 and other drawings is marked with a reference sign X. The rear floor panel 220 is a floor plate in a rear section of the vehicle, and is provided with a kick-up portion 222 near a rear wheel 300. The kick-up portion 222 inclinedly rises rearward for the purpose of securing the space for the suspension mechanism and the like for the rear wheel 300. The battery storage space 200 is formed as the space between the kick-up portion 222 and the floor cross member 240.

Referring to FIG. 1, the battery pack 100 includes a battery module 110, cooling fans 120A, 120B, and a control unit 130, all of which are stored in a case 150 (see FIG. 2). The battery module 110 is disposed closer to the rear wheel 300 than are the cooling fans 120A, 120B, and the control unit 130.

The cooling fans 120A, 120B send cooling air to the battery module 110. For example, the cooling fans 120A, 120B are disposed at both sides, respectively, across the vehicle width while sandwiching the control unit 130. For example, a sirocco fan may be used for the cooling fans 120A, 120B.

Inlets 122 are provided at the respective outer ends of the cooling fans 120A, 120B in the vehicle width direction. The inlets 122 allow intake of air in the vehicle cabin so that the intake air is sent to the battery module 110 as cooling air.

The control unit 130 performs power management of the battery module 110. For example, the control unit 130 may be constituted by a computer; that is, a battery ECU (electronic control unit). The control unit 130 manages charging-discharging and temperature of the battery module 110, for example.

The battery module 110 is configured to include a stack structure derived from layering a plurality of unit batteries called single cells. The single cell may be a lithium ion secondary battery, a nickel-hydrogen secondary battery, or an all-solid battery.

The battery pack 100 is detachably fastened to the vehicle cabin floor using bolts and nuts. Specifically, as shown in FIG. 2, a front end of the battery pack 100; that is, a front end flange 152A of a case cover 152, and a front end flange 154A of a case tray 154 are fastened and fixed to a cross member upper 250 of the floor cross member 240. A rear end flange 152B of the case cover 152, and a rear end flange 154B of the case tray 154 are fastened and fixed to the fastening panel 230. A substantially center of the case tray 154 in the vehicle front-rear direction is fastened and fixed to a battery cross 270 as a frame member extending in the vehicle width direction.

Referring to FIG. 2, the fastening panel 230 is attached to the kick-up portion 222 that is inclined in a side view. The fastening panel 230 has a stepped shape to provide a horizontal fastening surface in the periphery of the kick-up portion 222, for example. The rear end flange 152B of the case cover 152 and the rear end flange 154B of the case tray 154 of the battery pack 100 are detachably fastened to a point on the horizontal portion of the stepped shape using bolts and nuts. A front end of the fastening panel 230 is bonded to the kick-up portion 222. A rear end of the fastening panel 230 is bonded to a rear cross 280 as a frame member extending in the vehicle width direction.

Referring to FIG. 1, a pair of rockers 310, 310 as the frame members extending in the vehicle front-rear direction are disposed at respective (side) ends of the vehicle cabin in the vehicle width direction. Those rockers 310 serve to fix both ends of the floor cross member 240 in the vehicle width direction.

Figure 4:
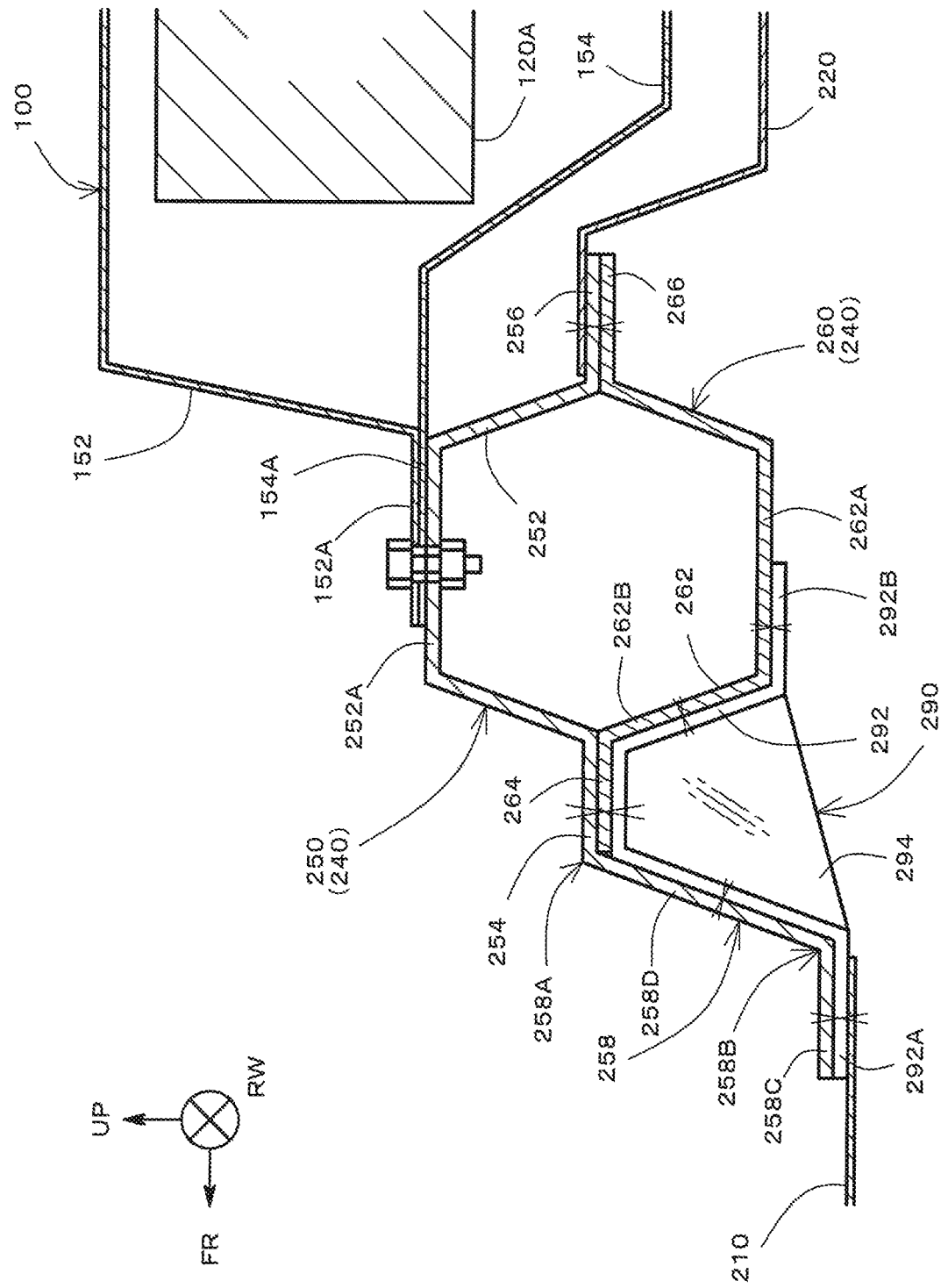
FIG. 4 illustrates an enlarged section around the reinforcement member shown in FIG. 2.

Referring to FIG. 2 and FIG. 4, the floor cross member 240 is the frame member constituted by the cross member upper 250 as the upper member, and a cross member lower 260 as the lower member. The cross member lower 260 includes a downward convex hat portion 262. The downward convex hat portion 262 having a hat-like shape with an open upper end is provided with a front flange 264 and a rear flange 266.

The cross member upper 250 includes an upward convex hat portion 252 and an extension portion 258. The upward convex hat portion 252 has a hat-like shape with an open lower end when seen from the vehicle width direction, and is provided with a front flange 254 and a rear flange 256.

The front flange 254 of the cross member upper 250 and the front flange 264 of the cross member lower 260 are joined and bonded, and the rear flange 256 of the cross member upper 250 and the rear flange 266 of the cross member lower 260 are joined and bonded. As a result, the closed section structure is formed by the upward convex hat portion 252 and the downward convex hat portion 262.

The front end flange 152A of the case cover 152 and the front end flange 154A of the case tray 154 of the battery pack 100 are detachably fastened to a top portion 252A of the upward convex hat portion 252 of the cross member upper 250 constituting the closed section structure, using the bolts and nuts.

The extension portion 258 is formed to extend forward from the front end of the front flange 254 of the cross member upper 250. The extension portion 258 serves to connect the floor cross member 240 to the front floor panel 210 to the front of the floor cross member.

Figure 6:
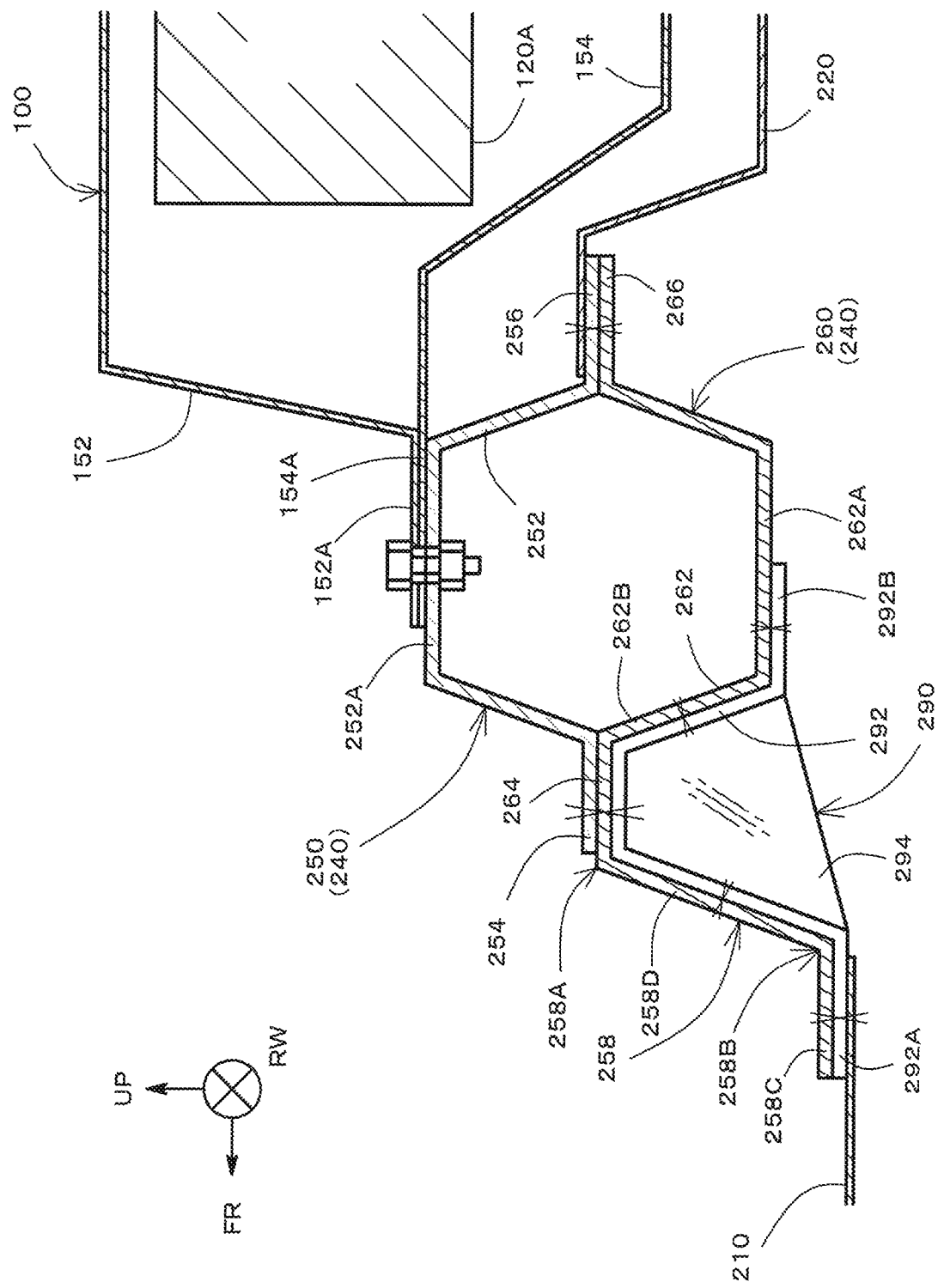
FIG. 6 illustrates an example of an extension portion of the cross member lower.
Figure 7:
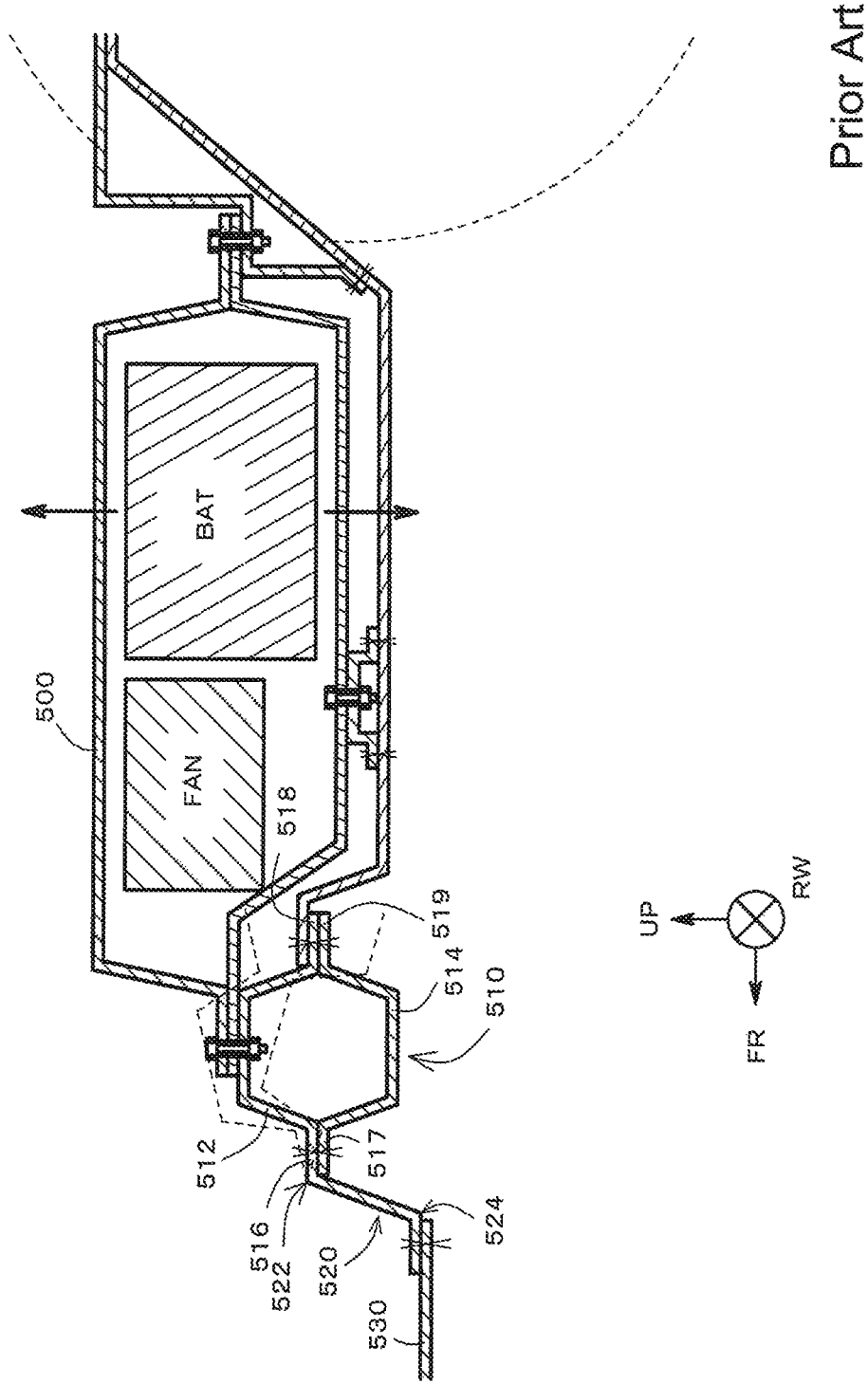
FIG. 7 is an explanatory view of a vertical vibration of a battery pack in a generally employed vehicular lower structure.
Figure 8:
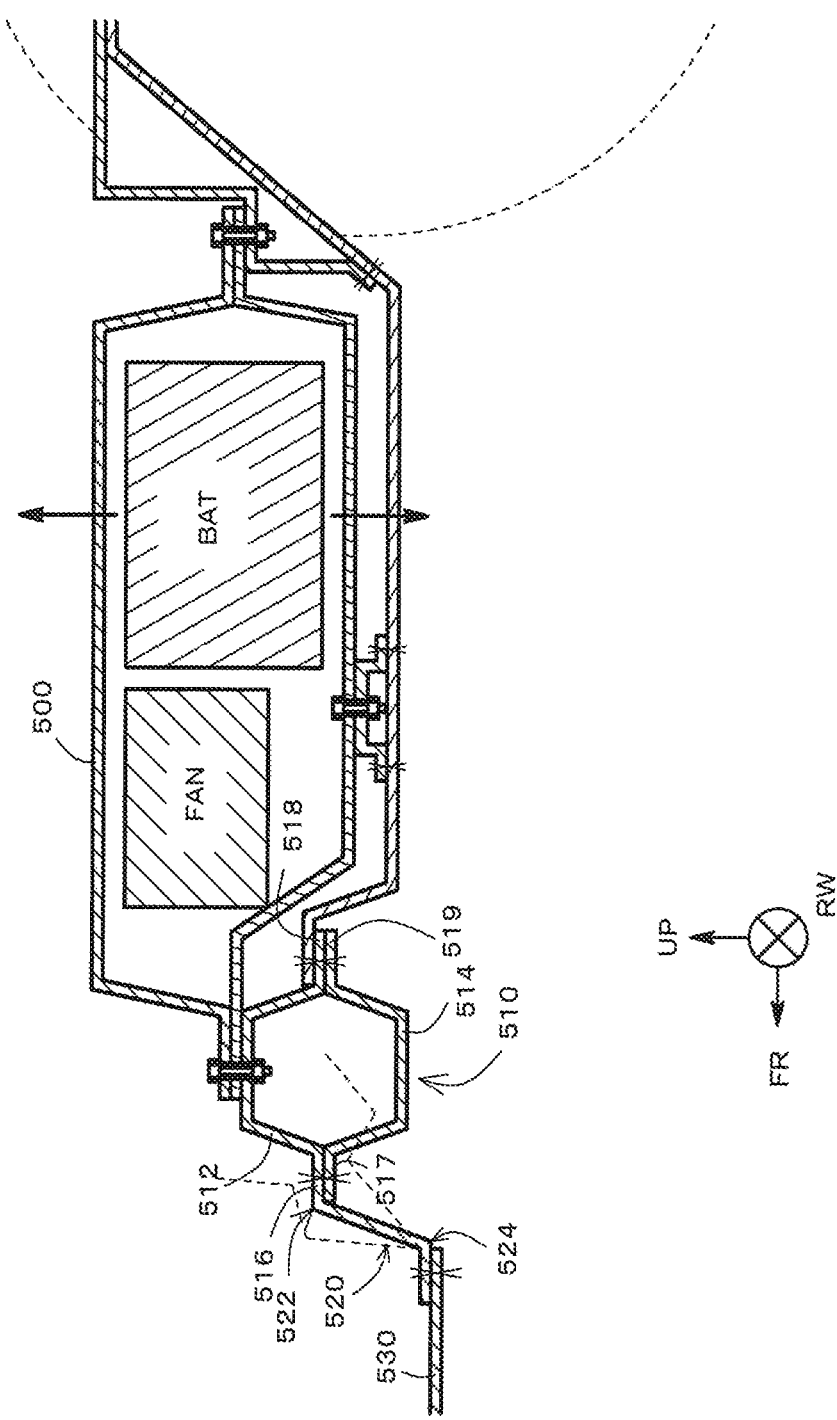
FIG. 8 is another explanatory view of vertical vibration of a battery pack in a generally employed vehicular lower structure.

The extension portion 258 may be formed to extend from either the cross member upper 250 or the cross member lower 260. Referring to FIG. 4, for example, the extension portion 258 extends from the front end of the front flange 254 of the cross member upper 250. However, the extension portion 258 may be formed to extend from the front end of the front flange 264 of the cross member lower 260 as shown in FIG. 6.

Referring to the state in FIG. 4, an explanation will be given about an exemplary structure in which the cross member upper 250 includes the extension portion 258. This applies to the structure in which the cross member lower 260 includes the extension portion 258.

As shown in FIG. 4, the front flange 254 is at the different height from the front floor panel 210 in the vehicle-height direction. Specifically, the front flange 254 is positioned higher than the front floor panel 210. The extension portion 258 is bent at the front end of the front flange 254 to extend downward to the front so that its front end is connected to the front floor panel 210 for connection between the front flange and the front floor panel.

As illustrated in FIG. 4, the extension portion 258 has a bent structure including bent points 258A, 258B. The extension portion extends between the bent points 258A and 258B in the unjoined state where the cross member lower 260 is not joined. Therefore, rigidity at each of the bent points 258A and 258B is relatively lower than that of the peripheral structure. Application of vertical urging force to the battery pack 100 may cause the risk of vertically vibrating the battery pack 100 owing to deformation that occurs at the bent points 258A, 258B.

In the vehicular lower structure of the embodiment, a reinforcement member 290 is provided for the extension portion 258. The reinforcement member 290 called "bulk" includes reinforcement flanges 292, rib plates 294, and a base plate 297 (see FIG. 3). The reinforcement member may be produced by press forming a metal material such as aluminum.

Figure 3:
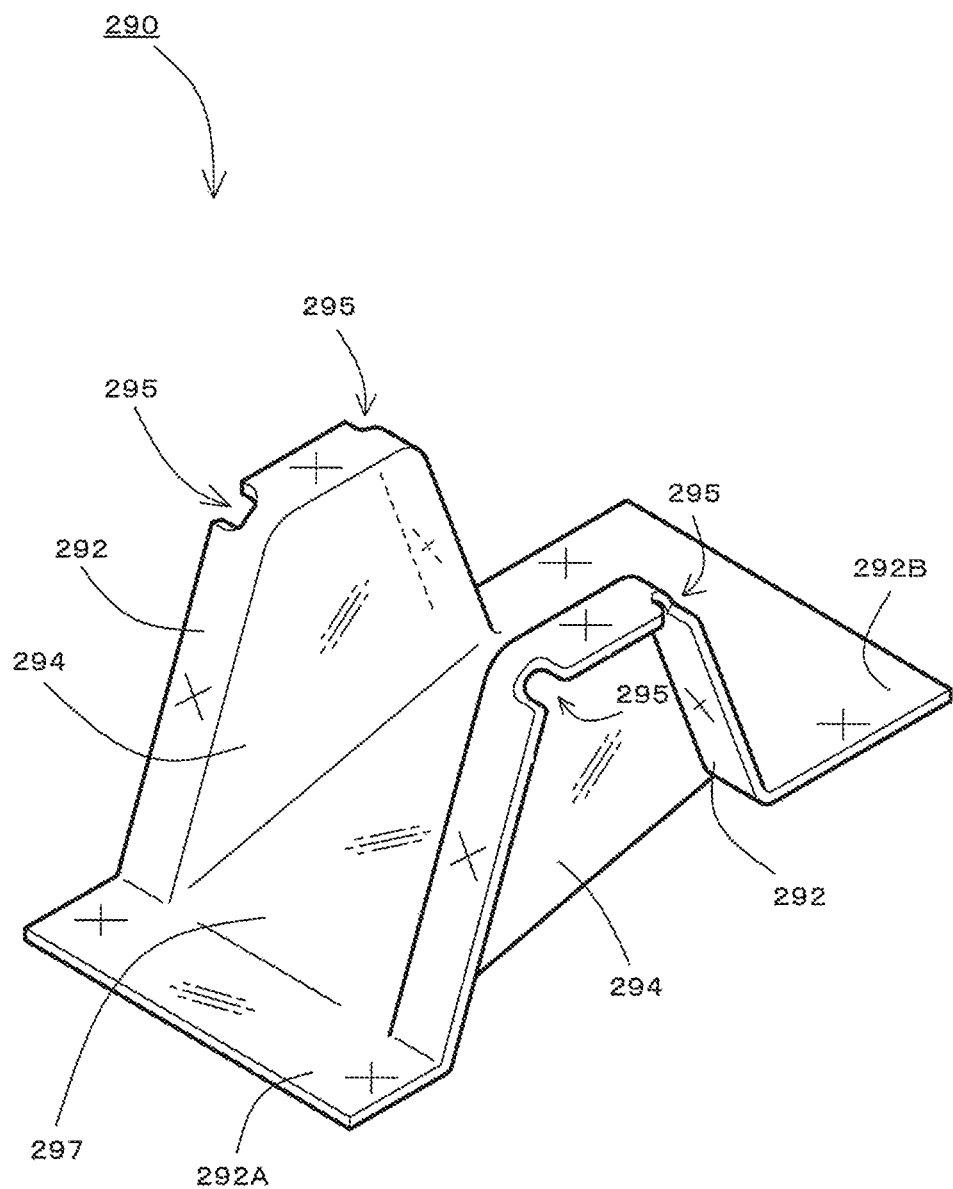
FIG. 3 is a perspective view of an exemplary reinforcement member.

FIG. 3 is a perspective view of the reinforcement member 290. The reinforcement member 290 includes a pair of rib plates 294, 294 disposed in the vehicle width direction. The respective lower ends of the rib plates are connected to the base plate 297.

The base plate 297 includes a front end flange 292A in the front section, and a rear end flange 292B in the rear section. The front end flange 292A is bonded to the front floor panel 210 together with a front end flange 258C of the extension portion 258 (see FIG. 4). The rear end flange 292B is bonded to a hat bottom portion 262A of the cross member lower 260.

The reinforcement flange 292 is bent adapted to the region from the front flange 254 of the cross member upper 250 to the front end flange 258C of the extension portion 258 so as to be joined and fixed to the front flange 254 and the extension portion 258.

The reinforcement flange 292 is joined (lined) with the downward convex hat portion 262, and fixed thereto while being bent adapted to the shape of the downward convex hat portion 262 of the cross member lower 260 further rearward of the front flange 254 of the cross member upper 250 and the front flange 264 of the cross member lower 260.

As illustrated in FIG. 4, the reinforcement flange 292 is bonded to five sections of the front end flange 258C, an extension side portion 258D, the front flange 264, a hat side portion 262B, and the hat bottom portion 262A. The reinforcement flange 292 serves to reinforce the bent points 258A, 258B of the extension portion 258; that is, prevent the deformation that would otherwise occur at the bent points 258A, 258B.

Referring to FIG. 3, undercut portions 295 are formed in corners of the respective reinforcement flanges 292 corresponding to the bent points 258A and 258B, respectively. The undercut portions are formed to avoid distortion of the metal at the corner in the press forming process (bending process). In order to reinforce the bent points 258A, 258B, the cut amount of the metal for forming the undercut portion 295 is required to be as small as possible. Therefore, the cut amount may be set to a minimum value allowable to avoid the above-described distortion.

Referring to FIG. 4, each of the rib plates 294 extends in the vehicle front-rear direction so as to be inserted into the opening between the extension portion 258 and the cross member lower 260. Specifically, the rib plate 294 is formed into a shape similar to that of a trapezoidal opening defined by the extension side portion 258D, the front flange 254, and the hat side portion 262B for insertion of the rib plate 294 into the opening.

Even if the load that is sufficiently heavy to deform the opening is applied to the extension portion 258 or the cross member lower 260, the rib plates 294 bear such load to restrain deformation of the opening.

In the embodiment, the extension portion 258 is lined with the reinforcement flange 292, and the rib plate 294 is inserted into the opening between the extension portion 258 and the cross member lower 260. Furthermore, the front floor panel 210 and the hat bottom portion 262A are connected with the reinforcement member 290. The above-described structure serves to restrain deformation that occurs at the bent point 258A, and deformation in the periphery of the reinforcement member 290. The amplitude of the vertical vibration of the battery pack 100 may be reduced more effectively than in the generally employed vehicular lower structure that cannot be provided with the reinforcement member.

Referring to broken lines around the floor cross member 240 as shown in FIG. 1, the reinforcement members 290 are provided for the floor cross member 240 along the vehicle width direction at equal intervals. As the reinforcement members 290 are disposed at equal intervals, the deformation of the extension portion 258 may be equally restrained.

Another Example of Reinforcement Member

Figure 5:
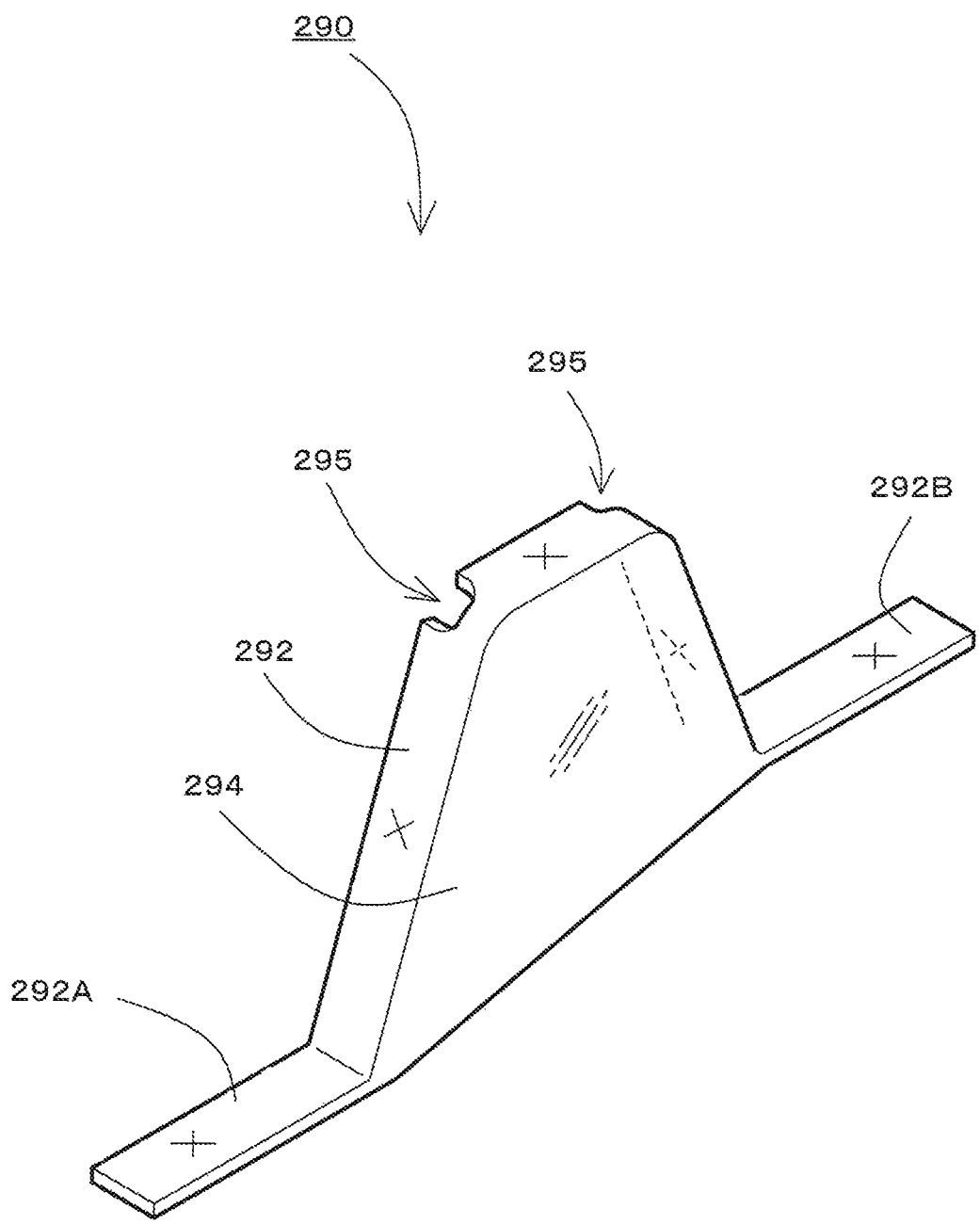
FIG. 5 is a perspective view of another exemplary reinforcement member.

FIG. 5 shows another example of the reinforcement member 290. In the example of the reinforcement member as shown in FIG. 3, pairs of the rib plates 294 and the reinforcement flanges 292 are provided. The reinforcement member of the example as shown in FIG. 5 has a single rib plate 294 and a single reinforcement flange 292. This structure also allows the extension portion 258 to be lined with the reinforcement flange 292, the rib plate 294 to be inserted into the opening between the extension portion 258 and the cross member lower 260, and the reinforcement member 290 to connect the front floor panel 210 and the hat bottom portion 262A. It is therefore possible to restrain the deformation that occurs at the bent points 258A, 258B, as well as the deformation in the periphery of the reinforcement member 290.

Another Example of Extension Portion

FIG. 4 shows that the extension portion 258 extends from the front flange 254 of the cross member upper 250. The vehicular lower structure of the embodiment is not limited to the one as described above. The extension portion 258 may be formed to extend from either the front flange 254 of the cross member upper 250 or the front flange 264 of the cross member lower 260. As illustrated in FIG. 6, the extension portion 258 may be formed to extend from the front flange 264 of the cross member lower 260.

As exemplified in FIG. 6, the front flange 264 is at a position higher than the front floor panel 210. The extension portion 258 is bent at the front end of the front flange 264 to extend downward to the front so that its front end is connected to the front floor panel 210 for connection between the front flange and the front floor panel.

Like the case as shown in FIG. 4, the extension portion 258 is reinforced with the reinforcement member 290. The reinforcement flange 292 is bent adapted to the region from the front flange 264 of the cross member lower 260 to the front end flange 258C of the extension portion 258 so as to be joined (lined) and fixed to the front flange 264 and the extension portion 258.

The rib plate 294 of the reinforcement member 290 extends in the vehicle front-rear direction, and is inserted into the opening between the extension portion 258 and the cross member lower 260. The reinforcement structures such as the reinforcement flange 292 and the rib plate 294 restrain the deformation that occurs at the bent points 258A, 258B, and the deformation in the periphery of the reinforcement member 290. As a result, the amplitude of the vertical vibration of the battery pack 100 may be reduced more effectively than in the generally employed vehicular lower structure that cannot be provided with the reinforcement member.

The present disclosure is not limited to the present embodiment described above, and includes all changes and modifications without departing from the technical scope or the essence of the present disclosure defined by the claims.

The invention claimed is:

1. A vehicular lower structure including a battery pack mounted on a floor, wherein:
 a front end of the battery pack is fixed to a floor cross member as a frame member extending in a vehicle width direction;
 the floor cross member includes a cross member upper as an upper member and a cross member lower as a lower member;
 the cross member upper includes an upward convex hat portion having a hat shape with an open lower section when seen from the vehicle width direction;
 the cross member lower includes a downward convex hat portion having a hat shape with an open upper section when seen from the vehicle width direction;
 a closed section structure is formed by fixing front flanges and rear flanges of the downward convex hat portion and the upward convex hat portion, respectively;
 one of the cross member lower and the cross member upper includes an extension portion that is bent at a front end of the front flange, and extends downward to a front side to connect a front end of the extension portion to a floor panel; and
 a reinforcement member is provided for the extension portion, the reinforcement member including:
 a reinforcement flange that is bent adapted to a region from the front flanges of the cross member lower and the cross member upper to the extension portion, the reinforcement flange being joined and fixed to the front flanges and the extension portion; and
 a rib plate inserted into an opening between the extension portion and the cross member lower while extending in a vehicle front-rear direction.

2. The vehicular lower structure according to claim 1, wherein the plurality of reinforcement members are disposed for the floor cross member at equal intervals along the vehicle width direction.

* * * * *